US011288025B2

(12) United States Patent
Martin et al.

(10) Patent No.: US 11,288,025 B2
(45) Date of Patent: Mar. 29, 2022

(54) JOB HANDLING WITH TIMING OUT

(71) Applicant: KYOCERA Document Solutions Inc., Osaka (JP)

(72) Inventors: Emilia Baranda Martin, Pacheco, CA (US); Michael Ong Martin, Pacheco, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/888,765

(22) Filed: May 31, 2020

(65) Prior Publication Data

US 2021/0373829 A1    Dec. 2, 2021

(51) Int. Cl.
*G06F 3/12*            (2006.01)
(52) U.S. Cl.
CPC .......... *G06F 3/1267* (2013.01); *G06F 3/1212* (2013.01); *G06F 3/1263* (2013.01); *G06F 3/12* (2013.01)
(58) Field of Classification Search
CPC .... G06F 3/1267; G06F 3/1263; G06F 3/1212; G06F 3/12

USPC ........................................................ 358/1.15
See application file for complete search history.

(56) References Cited

U.S. PATENT DOCUMENTS

| 6,038,040 A | 3/2000 | Nishimura et al. | |
| 7,929,173 B2* | 4/2011 | Tuchitoi | G06F 3/1204 358/1.16 |
| 10,158,778 B1 | 12/2018 | Yoshidome | |
| 2014/0313530 A1* | 10/2014 | Noguchi | G06K 15/022 358/1.12 |
| 2014/0380077 A1* | 12/2014 | Hara | G06F 1/3284 713/323 |

* cited by examiner

*Primary Examiner* — Marcus T Riley
*Assistant Examiner* — Darryl V Dottin
(74) *Attorney, Agent, or Firm* — W. Webostad

(57) ABSTRACT

Systems and methods relate generally to job handling by an information handling system. In an example method thereof, a timeout mode is provided for a job to be processed by the information processing system. A plurality of jobs including the job are queued in a buffer queue of the information processing system. The job is timed out. The job is moved down in the buffer queue in response to the timing out thereof. In an example of another method thereof, the job is canceled in response to the timing out thereof, rather than being moved down in the buffer queue.

15 Claims, 13 Drawing Sheets

```
!R!SEM6;EXIT;<ESC>%-12345X@PJL JOB NAME="Document1 100319
145818957"
@PJL SET TIMEOUT=300
@PJL SET RESOLUTION=600
@PJL SET KRESOLUTIONCONVERSION=OFF
@PJL SET BITSPERPIXEL=8
@PJL COMMENT="INFO:NUP 1; DUPLEX OFF; QTY 1; COLORMODE
COLOR; IPADDRESS <10.10.18.251>;"
@PJL COMMENT="APP:C:\Program Files\Microsoft Office\
Office16\WINWORD.EXE;"
@PJL COMMENT="USERDOMAIN:KTD.COM;"
@PJL SET ECONOMODE=OFF
@PJL SET KFEEDEDGE=SHORTEDGE
@PJL SET KLOGINID="user"
@PJL SET KLOGINPWD=""
@PJL SET USERNAME="emilia"
@PJL SET JOBNAME="Document1 100319 145818957"
@PJL SET QTY=1
@PJL SET KCOLORMODE=COLOR
@PJL SET KTIMEOUT=ON
@PJL SET KTIMEOUTLEN=60
@PJL SET KTIMEOUTACTION=PAUSEANDMOVE
@PJL SET KTIMEOUTTYPE=ACTIVETIME
@PJL SET KTIMEOUTLENTYPE=SPECIFIC
@PJL ENTER LANGUAGE=PCLXL
!R!SIR2;EXIT;) HP-PCL XL;3;0;Comment Copyright(C) 2020 Kyocera Corporation (17 U.S.C. 401)
```

300

301 (bracket encompasses the KTIMEOUT lines)

FIG. 3-1

```
!R!SEM6;EXIT;<ESC>%-12345X@PJL JOB NAME="Document1 100319
145818957"
@PJL SET TIMEOUT=300
@PJL SET RESOLUTION=600
@PJL SET KRESOLUTIONCONVERSION=OFF
@PJL SET BITSPERPIXEL=8
@PJL COMMENT="INFO:NUP 1; DUPLEX OFF; QTY 1; COLORMODE COLOR;
IPADDRESS <10.10.18.251>;"
@PJL COMMENT="APP:C:\Program Files\Microsoft Office\Office16\
WINWORD.EXE;"
@PJL COMMENT="USERDOMAIN:KTD.COM;"
@PJL SET ECONOMODE=OFF
@PJL SET KFEEDEDGE=SHORTEDGE
@PJL SET KLOGINID="emilia"
@PJL SET KLOGINPWD="password"
@PJL SET USERNAME="emilia"
@PJL SET JOBNAME="Document1 100319 145818957"
@PJL SET QTY=1
@PJL SET KCOLORMODE=COLOR
@PJL ENTER LANGUAGE=PCLXL
!R!SIR2;EXIT;) HP-PCL XL;3;0;Comment Copyright(C) 2020 Kyocera Corporation (17 U.S.C. 401)
```

```
!R!SEM6;EXIT;<ESC>%-12345X@PJL JOB NAME="Document1 100319
145818957"
@PJL SET TIMEOUT=300
@PJL SET RESOLUTION=600
@PJL SET KRESOLUTIONCONVERSION=OFF
@PJL SET BITSPERPIXEL=8
@PJL COMMENT="INFO:NUP 1; DUPLEX OFF; QTY 1; COLORMODE
COLOR; IPADDRESS <10.10.18.251>;"
@PJL COMMENT="APP:C:\Program Files\Microsoft Office\
Office16\WINWORD.EXE;"
@PJL COMMENT="USERDOMAIN:KTD.COM;"
@PJL SET ECONOMODE=OFF
@PJL SET KFEEDEDGE=SHORTEDGE
@PJL SET KLOGINID="user"
@PJL SET KLOGINPWD=""
@PJL SET USERNAME="emilia"
@PJL SET JOBNAME="Document1 100319 145818957"
@PJL SET QTY=1
@PJL SET KCOLORMODE=COLOR
@PJL SET KTIMEOUT=ON
@PJL SET KTIMEOUTLEN=ESTIMATE
@PJL SET KTIMEOUTACTION=CANCEL
@PJL SET KTIMEOUTTYPE=REALTIME
@PJL SET KTIMEOUTLENTYPE=ESTIMATOR
@PJL ENTER LANGUAGE=PCLXL
!R!SIR2;EXIT;) HP-PCL XL;3;0;Comment Copyright(C) 2020 Kyocera Corporation (17 U.S.C. 401)
```

300

301 { (lines: KTIMEOUT=ON through KTIMEOUTLENTYPE=ESTIMATOR)

FIG. 3-3

JOB HANDLING WITH TIMING OUT

COPYRIGHT OR MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD

The following description relates to an information processing system. More particularly, the following description relates to job handling by an information processing system including timing out of a job.

BACKGROUND

Conventionally, large print jobs may take one or more hours to print. Another user may not be able to interrupt an ongoing large print job in order to print their own print job.

SUMMARY

In accordance with one or more below described examples, a method relating generally to job handling by an information processing system is disclosed. In such a method, a timeout mode is provided for a job to be processed by the information processing system. A plurality of jobs including the job are queued in a buffer queue of the information processing system. The job is timed out. The job is moved down in the buffer queue in response to the timing out thereof.

In accordance with one or more below described examples, an apparatus relating generally to an information processing system configured for job handling is disclosed. In such a system, a driver has timeout mode for a job to be processed by the information processing system. A buffer queue is for queuing a plurality of jobs including the job. The driver is configured to: time out the job; and move the job down in the buffer queue in response to the time out thereof.

In accordance with one or more below described examples, another method relating generally to job handling by an information processing system is disclosed. In such a method, a timeout mode is provided for a job to be processed by the information processing system. A plurality of jobs including the job is queued in a buffer queue of the information processing system. The job is timed out. The job is canceled in response to the timing out thereof.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block-flow diagram depicting another example of a job handling flow.

FIG. 2-1 is a pictorial diagram depicting an example of interactive user-interface ("UI") image ("UI image") displayed on a display or a display surface ("display").

FIG. 2-2 is a pictorial diagram depicting an example of a UI image of a printer properties window or device manager window displayed on a display.

FIG. 2-3 is a pictorial diagram depicting an example of a UI image of a new user property window displayed on a display.

FIG. 2-4 is a pictorial diagram depicting an example of a UI image displayed on a display.

FIG. 3-1 is a code listing diagram depicting an example of a portion of a print job listing.

FIG. 3-2 is a code listing diagram depicting an example of a portion of another print job listing.

FIG. 3-3 is a code listing diagram depicting another example of a portion of a print job listing.

FIG. 4 is a pictorial diagram depicting an example of a network.

DETAILED DESCRIPTION

Figure 1:
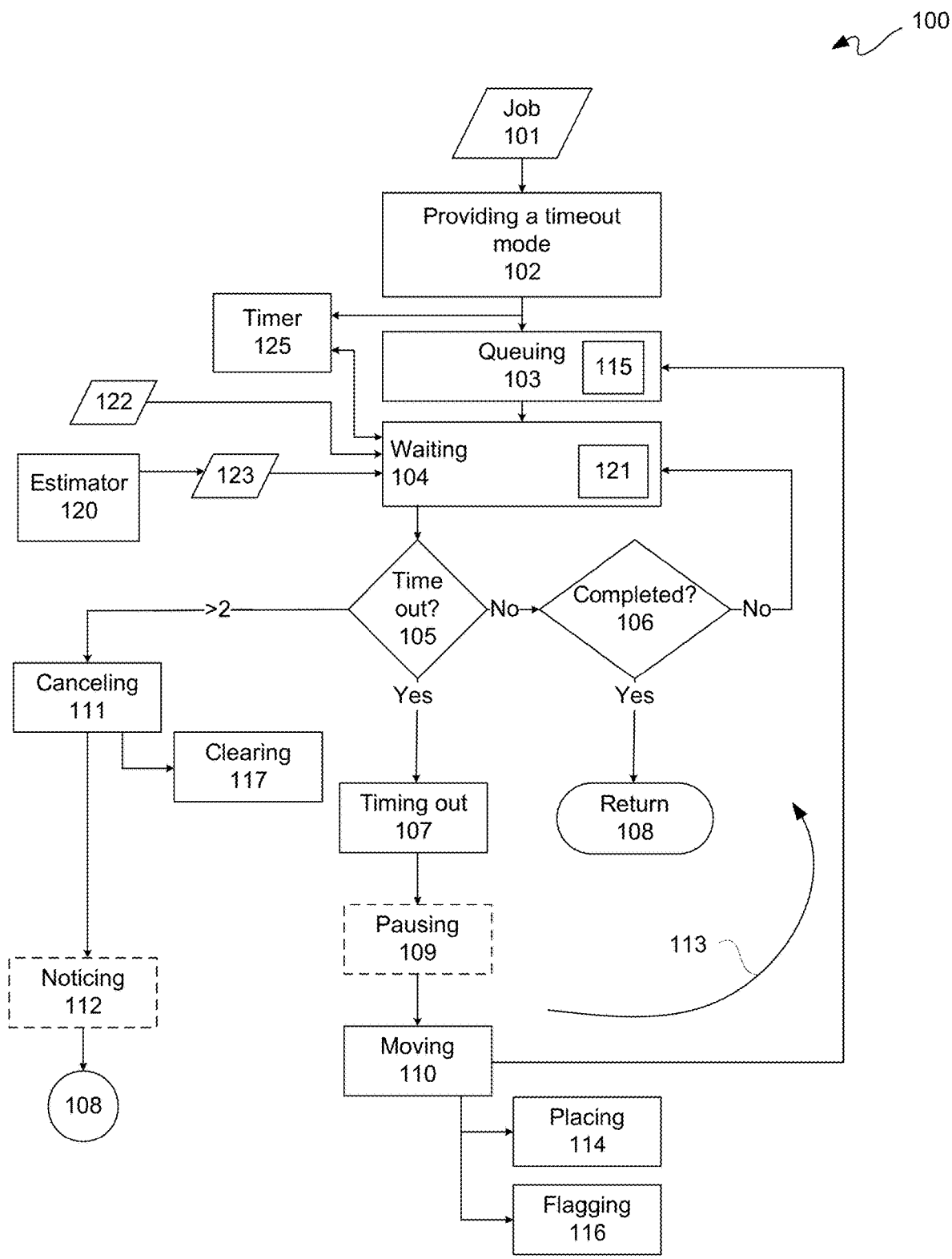
FIG. 1-1 is a block-flow diagram depicting an example of a job handling flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As previously indicated, large print jobs may take one or more hours to print. To allow other users to interrupt ongoing large print jobs in order to print their own print jobs, a timeout is provided. In another example, a user might not have any idea how long printing of their document will take, but want to print as many copies as possible within a preset window, such as for example a 1-, 2-, or 3-hour window.

With the above general understanding borne in mind, various configurations for information handling systems, and methods therefor, with timeout capabilities are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a block-flow diagram depicting an example of a job handling flow 100. A job 101 may be received by an information processing system. Any of a variety of job handling information processing systems may be used. For example, an information handling system may be a printing device, a scanning device, a faxing device, a copying device, or a combination of one or more of these devices. For purposes of clarity by way of example and not limitation, it shall be assumed that an information processing system is a printer, and accordingly job 101 is a print job. However, in other examples, job 101 may be a scan job, a fax job, a copy job, a combination thereof, or another type of job for another type of information processing system.

At operation 102, a timeout mode may be provided for a print job 101 to be processed by a printer. For a printer, a printer driver, such as may be hosted by a computer or other information processing system, may be used to provide a timeout mode. In another example of an information handling system, another type of driver may be used.

A timeout setting for print jobs can be specified by printer driver setting and/or a part of print job data. Information processing system settings, such as printer setting for the current example, may be applied to: (a) all print jobs; (b) all print jobs of specific users; (c) all print jobs of specific groups of users; and/or (d) other groupings.

Selection or activation of a timeout mode at operation 102 may be used to trigger a timer 125. Timer 125 may be a free running clock for a real-time type setting or a tolled running clock for an active-time type setting to determine a duration of pendency of a print job 101 for such types of timing. Output of timer 125 may be provided to a waiting operation 104 to indicate a duration of a current print job 101. For tolling time such as for an active-time type setting, waiting operation 104 may stop and restart timer 125.

At operation 103, a plurality of jobs including print job 101 may be queued in a buffer queue of a printer or other location of a buffer queue. At operation 104, a wait state or waiting for a print job 101 to timeout or complete may be entered. A wait state may have a set duration or length of time stored in a duration buffer 121. In an example, a user inputs or a default length of time setting 122 is input to duration buffer 121. In another example or in addition to the above example, an estimator 120 may generate an estimated length of time setting 123 for populating a duration buffer 121 for a length of time to wait at operation 104. Along those lines, there are known estimators for estimating preflight duration of a print job, such as for example as in U.S. Pat. No. 7,345,781. As printers configured with preflight time estimators are known, estimator 120 is not described in unnecessary detail herein.

At operation 105, it may be determined whether or not a print job 101 is to be timed out for an active timeout mode. An activated timeout mode may be associated with print job 101, as previously described. If a current print job 101 is not to be timed out as determined at operation 105, then it may be determined at operation 106 whether or not such a current print job 101 has completed, such as completed printing in the current example.

If, at operation 106, it is determined a current print job 101 has not completed printing, then job handling flow 100 returns to or stays in a wait state at operation 104. However, if, at operation 106, it is determined a current print job 101 has completed printing, then job handling flow 100 may end or return at operation 108.

If, at operation 105, it is determined that a current print job 101 is to be timed out, then such a current print job may be timed out at operation 107. In response to being timed out, there are different examples provided herein. In the example of FIG. 1-1, a timed-out print job 101 is optionally paused at pausing operation 109. In this example, after pausing, a time-out print job 101 may further be moved down within a job queue, such as a spooled print job queue, a at moving operation 110.

Effectively, a timed-out print job 101, after moving, may be returned to a queue at queuing operation 103 with a queue priority or position setting set at moving operation 110. Along those lines, a moving operation 110 may include a placing operation 114. In an example of a placing operation 114, a current print job may be placed at the end of a buffer queue 115, such as by way of a setting for placement in a buffer queue 115 or by way of loading a current print job in a buffer queue 115.

In another example of a moving operation 110, a flagging operation 116 may be included. A flagging operation 116 may be used to set a flag to travel with a print job. Such a flag may be set for having a print job resume processing by a printer or other information processing system after a set number of other jobs of a plurality of jobs in buffer queue 115 have been processed since a pausing or timing out of a current print job 101. A set number of other jobs may be operative set to be one greater than a total number of a plurality of jobs currently in a buffer queue 115 at the pausing of a current print job. However, other examples of placing a print job in a buffer queue 115 may be used.

After moving, or virtually moving, a timed-out or paused print job 101 down in posting position in a buffer queue 115, job handling flow 100 may continue with respect to processing such a print job 101. While a moving operation 110 may be set to allow more people to have access to a printer, so as one person for example does not tie-up a printer, a moving operation may use flagging to provide a hierarchy of access. Along those lines, a print job 101 in an example may be place behind only those print jobs of higher priority.

However, for a print job 101 cycling or looping within job handling flow 100, a check may be performed at time out operation 105 to determine whether a print job has looped or cycled more than a set number of times. In this example for a loop 113, it is determined at operation 105 whether a current print job 101 has been cycled more than two times. In this example, loop 113 does not include operation 106.

Accordingly, a print job 101 may be paused and moved to the back or end of a printer buffer queue 115 to be resumed later in processing thereof by a printer. For example, a print job 101 may be paused and moved to after an integer N print jobs in a buffer queue 115 to be resumed later, where N may be a printer setting or a user-specified setting. Additionally, when a print job 101 is interrupted by being timed-out to be resumed at a later time, a user may specify whether such a resumed print job is still subject to the same timeout settings as in an original or first time through loop 113. or is to be allowed to finish printing free from any further timeout interruption or interruptions. Along those lines, flagging operation 116 may be used to increment a counter for each time through a loop 113 for a current print job 101.

If a current print job has not cycled more than two times as determined at operation 105, then either a timing out operation 107 or a completed determining operation 106 may be performed, as previously described. If, however, a current print job 101 is on its third time through loop 113, then at operation 105 a canceling operation 111 may be invoked.

Canceling operation 111 may be used to cancel a current print job 101. In this example, a canceling operation 111 may be invoked rather than timing out such print job once again. A canceling operation 111 of a print job may include a clearing 117 of buffer queue 115 of such print job to allow a next print job in such buffer queue to be processed by a printer or other information processing system. Optionally, after canceling, a notice may be sent at noticing operation 112 to inform a user their print job has been canceled. After canceling or noticing, job handling flow may end or return at operation 108.

Figures 1, 2:
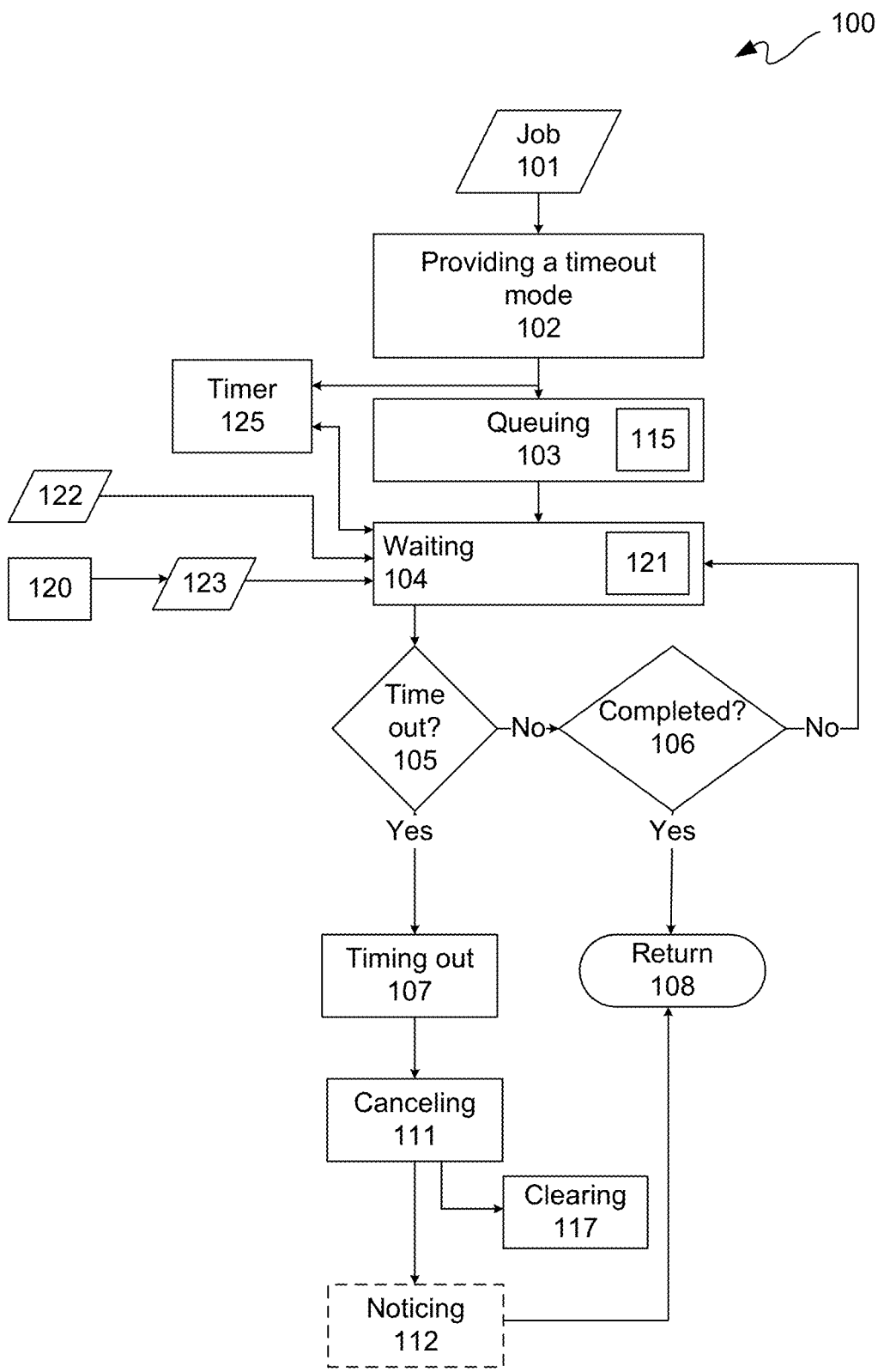

FIG. 1-2 is a block-flow diagram depicting another example of a job handling flow 100. As job handling flow 100 of FIGS. 1-1 and 1-2 have some same elements, generally only the differences are described below for purposes of clarity and not limitation.

In this example, there is no check for looping at time-out operation 105 is performed, as no loop 113 is present. Furthermore, in this example, after a timing out operation 107, a canceling operation 111, which may include a clearing operation 117, may be performed to immediately cancel a timed-out print job 101. Again, optionally, after canceling, a notice may be sent at noticing operation 112 to inform a user their print job has been canceled. After canceling or noticing, job handling flow may end or return at operation 108.

FIG. 2-1 is a pictorial diagram depicting an example of interactive user-interface ("UI") image ("UI image") 210 displayed on a display or a display surface ("display") 200. With simultaneous reference to FIGS. 1-1 through 2-1, UI image 210 is further described.

Continuing the example of an information handling system in communication with a printer for purposes of clarity and not limitation, a printer driver may include a plurality of settings for a timeout mode including for activating or toggling a timeout mode. Along those lines, a printer driver or another driver may generate and display UI image 210. In another example, an app may have embedded therein a timeout activation mode and settings therefor.

For a timeout mode activation setting 201 set to be active for activation of a timeout mode, other settings may be selectively set or set by default or a combination thereof.

A length of timeout setting 202 may be set using of UI image 210. A length of timeout setting 202 may include a length field 203-1 for inputting, such as by a user or by default, a duration of a timeout for a timeout mode. In this example, such a duration is expressed in minutes; however, this and/or another unit or units of time may be used in another example. This setting was previously described as length of time setting 122.

Another setting of a plurality of settings may include another length of timeout setting, such as for example having a length type being an estimated type by an estimator. In other words, rather than selecting length of timeout setting 202, an estimator time setting 204 may be selected using of UI image 210. Selecting an estimator time setting 204, may cause an estimator 120 to determine an estimated length of time for a print job 101. Such an estimated length of time may populate a length of timeout setting 203-2 associated with an estimated duration. This setting was previously described as estimated length of time setting 123. Either of these setting types for time may be used as a duration, and thus either a length of timeout setting 203-1 or 203-2 may be operative at a time.

Another setting of a plurality of settings which may be set using of UI image 210 may be a timeout action setting 205. A timeout action setting 205 may be used to indicate what is to transpire in response to invocation of a timeout. For example, a user or a default may select a cancel job setting 206. A cancel job setting 206 may be used for canceling operation 111 to be invoked immediately after a timeout, such as in the example of FIG. 1-2. A user or a default may select a pause and move to end of queue setting 207 for a timeout action setting 205. This selection may be used for invoking operations 109 and 110, including configuring placing operation 114, in the example of FIG. 1-1. A user or a default may select a pause and resume after no more than N other jobs setting 208 for a timeout action setting 205. This selection may be used for invoking operations 109 and 110, including configuring placing operation 114, in the example of FIG. 1-1.

With reference to placing operation 114, settings 207 and 208 may be used for configuring where to relocate a current print job in buffer queue 115. A user may input a positive integer N greater than zero into number field 209 for indicating a maximum number of locations for placing a current print job 101 back down in a buffer queue 115 for setting 208. Placing operation 114 is configured responsive to such N integer input. For selecting of setting 207, a current print job is placed at the end of a current buffer queue 115, and placing operation 114 is configured responsive to such selection.

Another setting of a plurality of settings which may be set using of UI image 210 may be a timeout time type setting 211. A timeout type, whether it is "real-time" type 212 or "active-time" type 213, may be set by default or by a user. For a real-time type 212 selected for a timeout mode active, a timer 125 may start running at the queuing of a print job 101 at operation 103 or immediate before or after queuing, and processing of such print job may stop when time runs out, such as for example all of a length of duration of time set or estimated for wait time is used up. Whereas for an active-time type 213, after timer 125 is started as previously described, timer 125 may be paused such as for each duration of time a printer not actually printing, including in association with printing a current print job 101 as well as one or more other print jobs ahead for such a current print job. Timer 125 may be paused by waiting operation 104 such as when waiting for user intervention including printer error events such as load paper, error, or paper jam, among others. In other words, an active-time type may be tolled or suspended for one or more periods of a printer being offline.

FIG. 2-2 is a pictorial diagram depicting an example of a UI image of a printer properties window or device manager window 220 displayed on a display 200. Settings set by a user or by default may be populated on or through to print settings as part of common settings of a system menu, such as a printer properties or device manager window 220. Of course, one or more of these example settings and/or one or more other settings describe herein may be used in other examples.

Figures 1, 2:
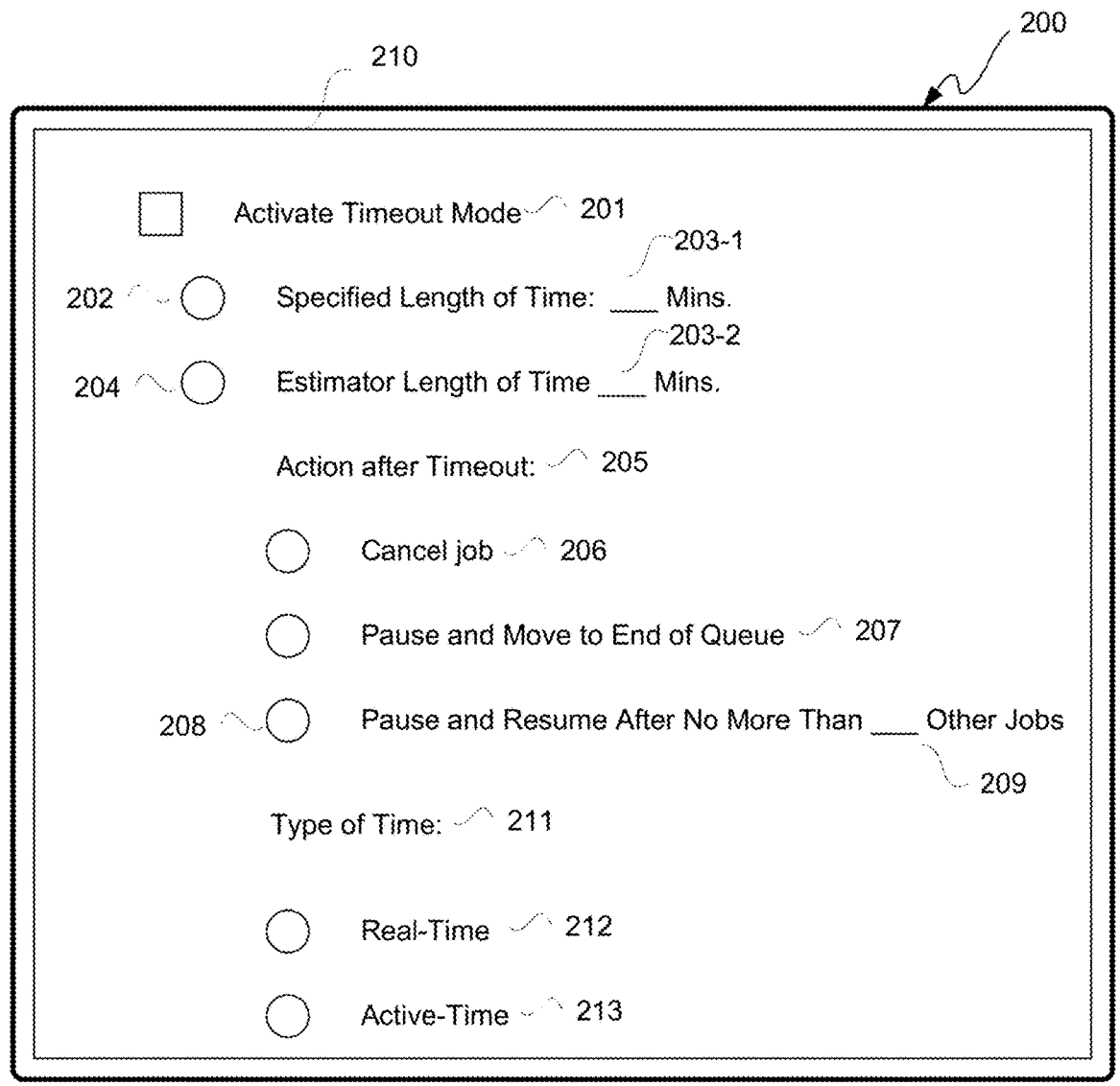
Figure 2:
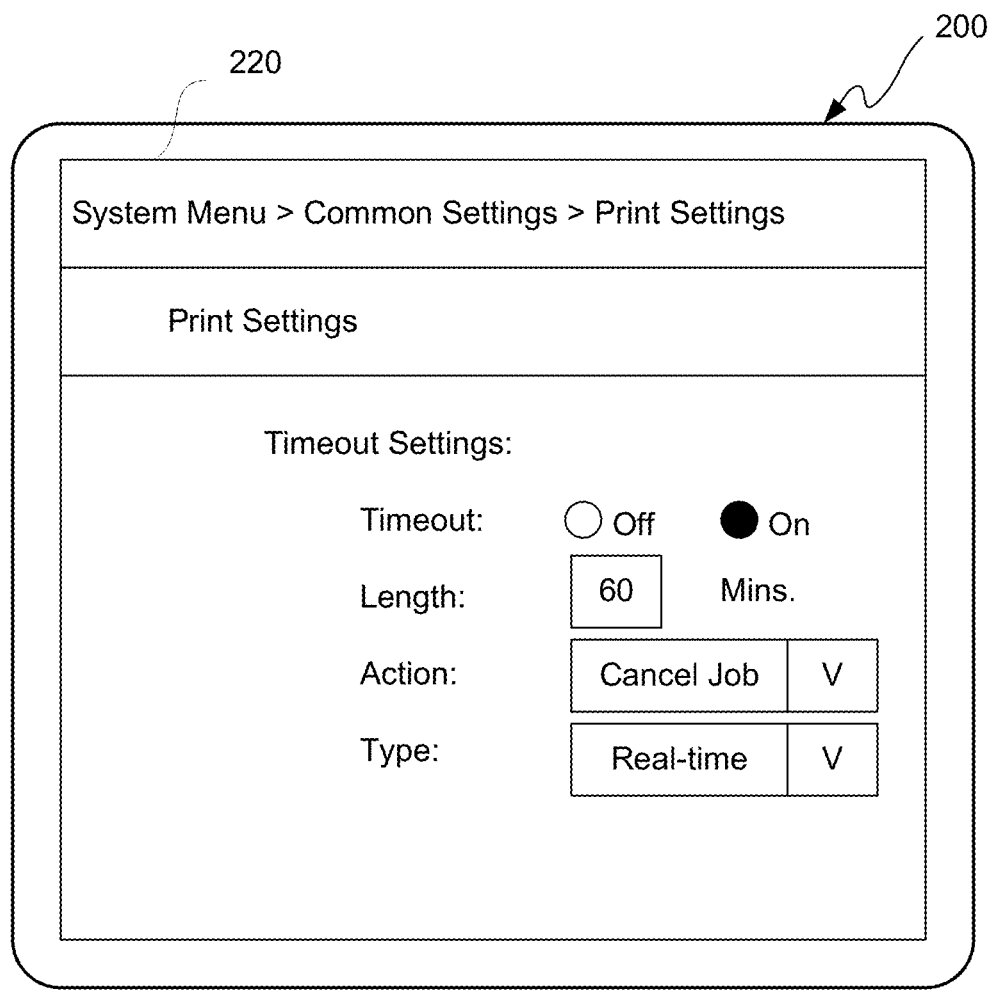
Figures 2, 3:
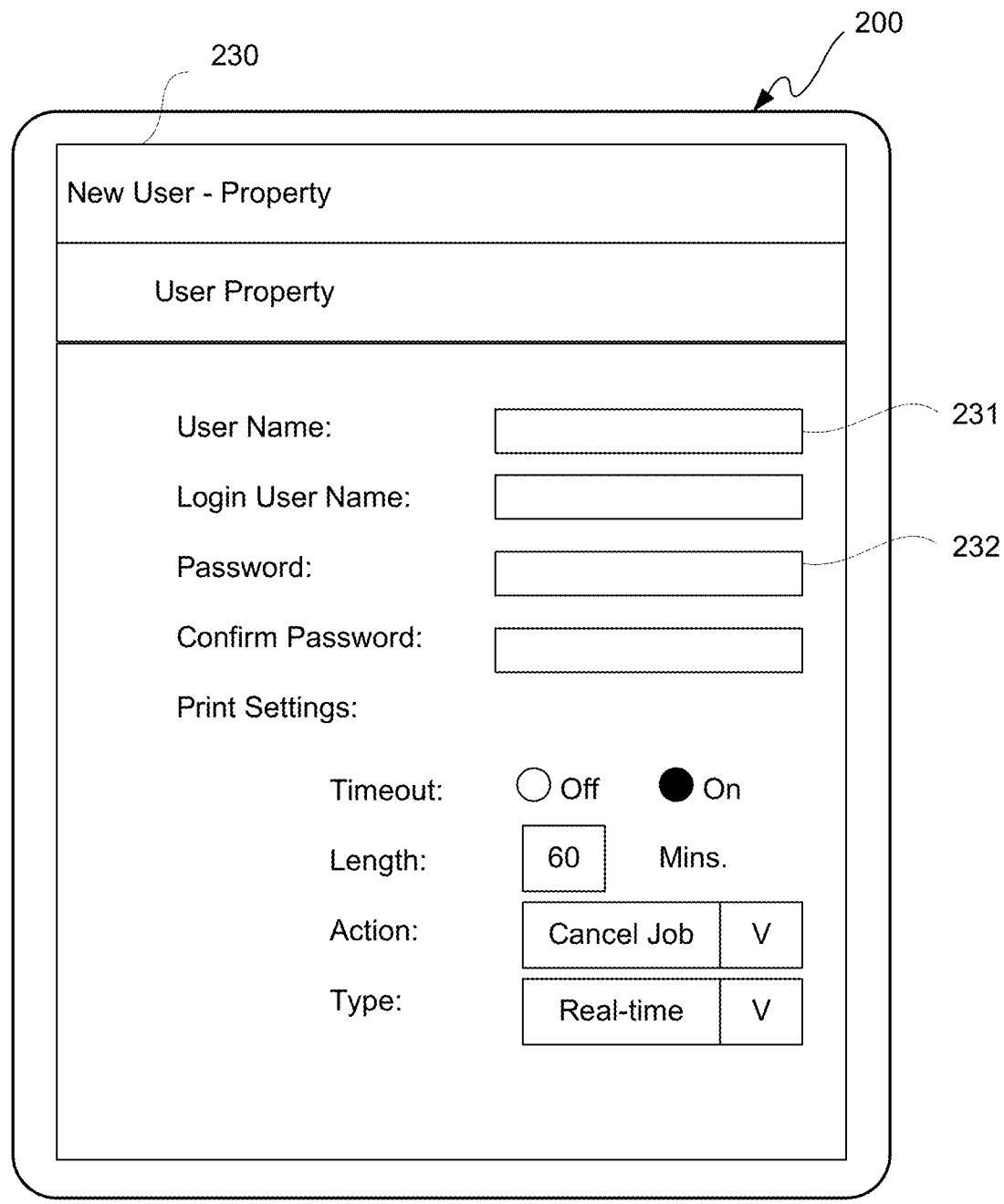

FIG. 2-3 is a pictorial diagram depicting an example of a UI image of a new user property window 230 displayed on a display 200. Settings set by a user or by default may be populated on or through to new user settings as part of a user property section. Along those lines, a plurality of settings may include a user identity setting 231 and a user password setting 232. Control of access to this section may be by user name and password, which may be set up, as is known. Of course, one or more of these example settings and/or one or more other settings describe herein may be used in other examples.

Figures 2, 3, 4:
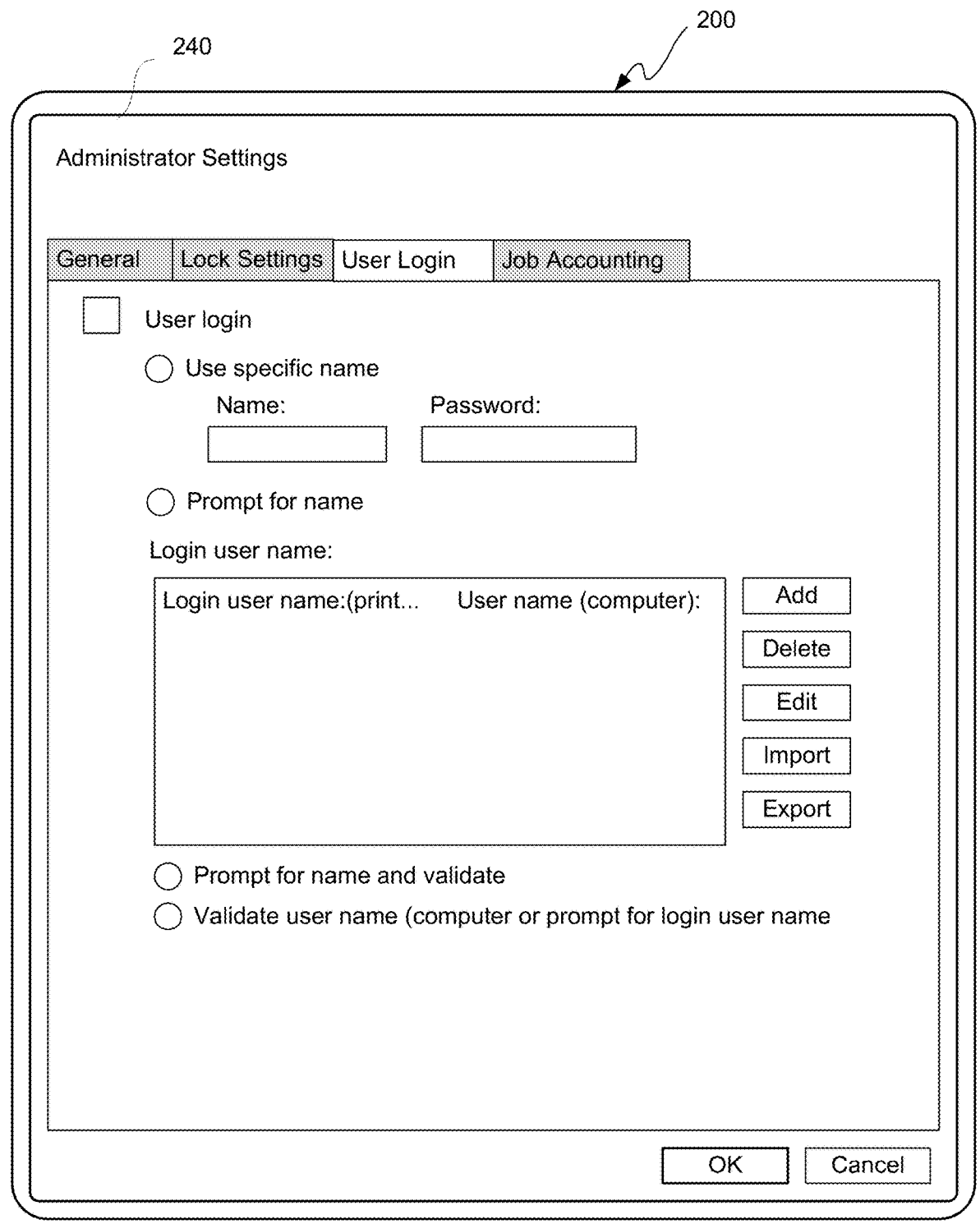
Figure 4:
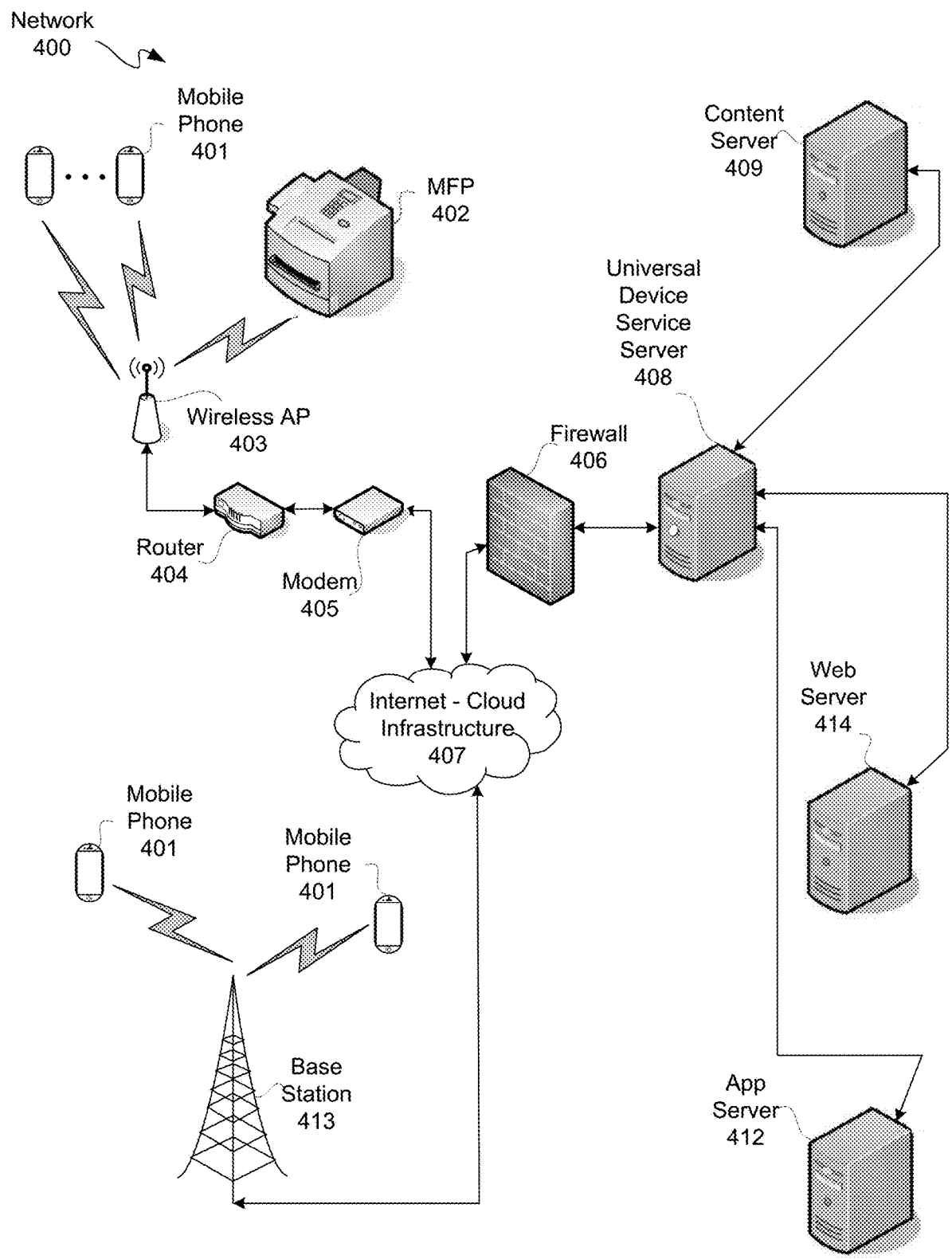

FIG. 2-4 is a pictorial diagram depicting an example of a UI image 240 displayed on a display 200. Settings set by an administrator may be populated on or through to user settings as part of a user property section, as previously described. Control of access to this section may be by user name and password, which may be set up by an administrator. Of course, one or more of these example settings and/or one or more other settings describe herein may be used in other examples.

FIG. 3-1 is a code listing diagram depicting an example of a portion of a print job listing 300. Print job listing 300 may include settings 301 in accordance with the description herein. In this example, print job listing 300 is in a print job language (PJL). A PJL is a type of page description language (PDL) which travels with a print job. However, another type of a PDL may be used in another example.

Settings 301 as described herein may travel with a print job 101. For example, timeout activation, action, time type, specific/estimator, and/or length settings 301 may travel with a print job 101. In this example, settings 301 include: a timeout mode (TIMEOUT) is ON; a timeout length (TIMEOUTLEN) is set to a specific value of 60 minutes in this example (though some other amount and/or unit of time may be used in another example); a timeout action (TIMEOUTACTION) is set to pause and move (PAUSEANDMOVE) a print job; a timeout type of time (TIMEOUTTYPE) is set to active-time (ACTIVETIME); and a timeout length type is set to a specific (SPECIFIC). Of course, one or more of these and/or other settings described herein may be used in another example.

FIG. 3-2 is a code listing diagram depicting an example of a portion of a print job listing 305. Print job listing 305 may include settings 303 in accordance with the description herein. In this example, print job listing 305 is in a PJL. However, another type of a PDL may be used in another example.

Settings, such as for example settings 301 and/or 303, as described herein may travel with a print job 101 from a host information processing system to a job or information handling system, such as a printing device for example. Along those lines, for example username and password settings 303 may travel with a print job 101. Of course, one or more of these and/or other settings described herein may be used.

FIG. 3-3 is a code listing diagram depicting another example of a portion of a print job listing 300. Print job listing 300 may include in this example another set of settings 301 in accordance with the description herein. Again, in this example, print job listing 300 is in a PJL; however, another type of a PDL may be used in another example.

Settings 301 as described herein may travel with a print job 101. For example, timeout activation or mode, action, time type, specific/estimator time, and/or length settings 301 may travel with a print job 101. In this example, settings 301 include: a timeout mode (TIMEOUT) is ON; a timeout length (TIMEOUTLEN) is set to an estimated value (ESTIMATE) in minutes (though some other unit of time may be used in another example); a timeout action (TIMEOUTACTION) is set to cancel (CANCEL) a print job; a timeout type of time (TIMEOUTTYPE) is set to real-time (REALTIME); and a timeout length type is set to an (ESTIMATOR). In this example, selecting an estimator output, which is called ESTIMATE in this example, of an ESTIMATOR for a timeout length type, automatically causes such an estimated value output to be used for a timeout length. Such an estimated value may be generated upon setting or queuing a job for purposes of populating a timeout length field. Of course, one or more of these and/or other settings described herein may be used in another example.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 500 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
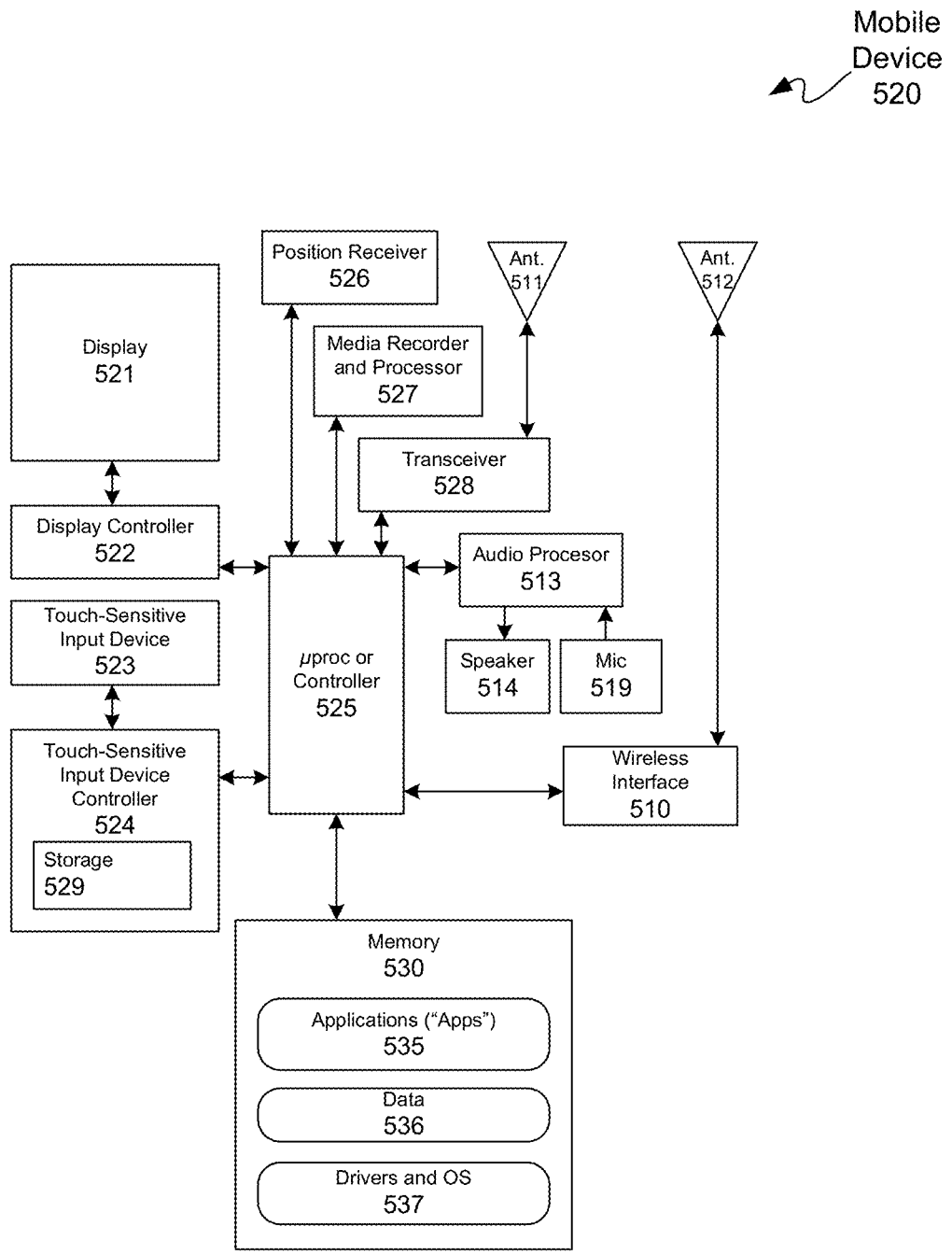
FIG. 5 is block diagram depicting an example of a portable communication device.

FIG. 5 is block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder and processor 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
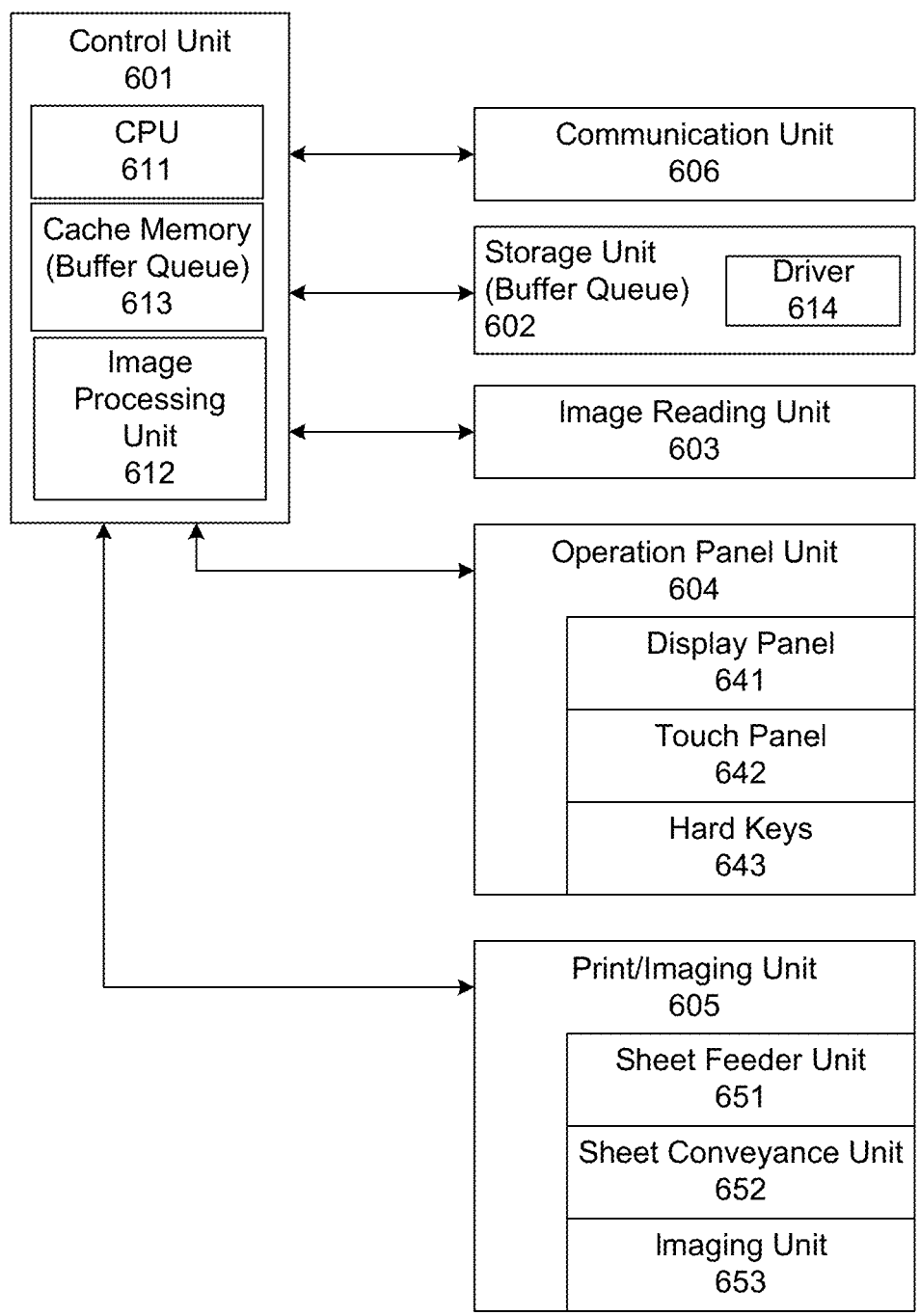
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example. MFP 600 is an example of an information processing system such as for handling a print job 101 as previously described.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer driver 614. A printer driver as described above may be hosted in all or a portion of a computer system, as described below, whereas printer driver 614 may be a separate driver software for operation of MFP 600. A buffer queue, such as buffer queue 115 as previously described herein, may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
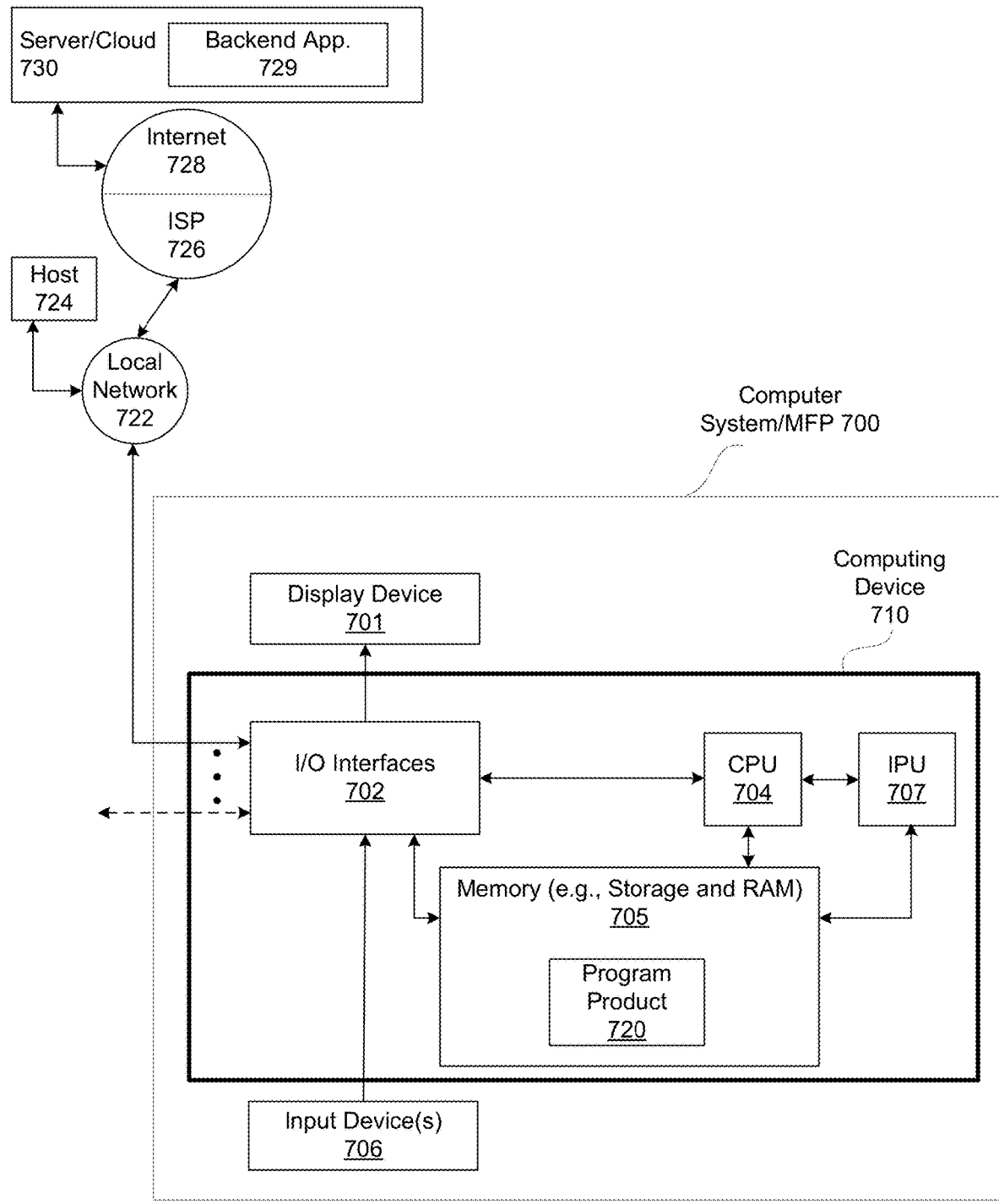
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for an information processing system, comprising:
    providing a timeout mode for a job to be processed by the information processing system;
    queuing a plurality of jobs including the job in a buffer queue of the information processing system;
    timing out the job; and
    moving the job down in the buffer queue in response to the timing out thereof;
    wherein:
        the information processing system is programmed with a printer driver;
        the printer driver is configured for communication with a printing device and includes a plurality of settings for the timeout mode including:
            a timeout mode activation setting;
            a length of timeout setting;
            a timeout action setting;
            a timeout time type setting; and
            a length type for the length of timeout setting, the length type being an estimate type;
        determining an estimated length of time with an estimator; and
        populating the length of timeout setting with the estimated length for the length type being the estimate type.

2. The method according to claim 1, wherein the moving includes placing the job at the end of the buffer queue.

3. The method according to claim 1, wherein the moving includes flagging the job for resuming processing thereof by the information processing system after a set number of other jobs of the plurality of jobs have been processed since the timing out of the job.

4. The method according to claim 3, further comprising:
    pausing the job after the timing out thereof; and
    wherein for the set number of other jobs being greater than a total number of the plurality of jobs in the buffer queue at the pausing of the job, setting the set number of other jobs equal to the total number of the plurality of jobs in the buffer queue.

5. The method according to claim 1, further comprising:
    providing a length field for inputting a duration of a timeout for the timeout mode; and
    setting a type of time for the duration.

6. The method according to claim 5, wherein the type of time is real-time type.

7. The method according to claim 5, wherein the type of time is active-time type.

8. The method according to claim 1, wherein the plurality of settings is included with the job for traveling therewith to the printing device.

9. An information processing system, comprising:
    a driver having timeout mode for a job to be processed by the information processing system;
    a buffer queue for queuing a plurality of jobs including the job; and
    the driver configured to:
        time out the job;
        move the job down in the buffer queue in response to the time out thereof for a timeout mode;
        provide a plurality of settings for the timeout mode including:
            a timeout mode activation setting;
            a length of timeout setting;
            a timeout action setting;
            a timeout time type setting; and
            a length type for the length of timeout setting, the length type being an estimate type;
        determine an estimated length of time with an estimator; and
        populate the length of timeout setting with the estimated length for the length type being the estimate type;

wherein the estimator is configured to estimate a duration of time to process the job by the information processing system.

10. The system according to claim 9, further comprising a timer to determine a duration of pendency of the job.

11. A method for an information processing system, comprising:
   providing a timeout mode for a job to be processed by the information processing system;
   queuing a plurality of jobs including the job in a buffer queue of the information processing system;
   timing out the job;
   canceling the job in response to the timing out thereof;
   wherein:
      the information processing system is programmed with a printer driver;
      the printer driver is configured for communication with a printing device and includes a plurality of settings for the timeout mode including:
         a timeout mode activation setting;
         a length of timeout setting;
         a timeout action setting;
         a timeout time type setting; and
         a length type for the length of timeout setting, the length type being an estimate type;
      determining an estimated length of time with an estimator; and
      populating the length of timeout setting with the estimated length for the length type being the estimate type.

12. The method according to claim 11, wherein the canceling of the job includes clearing the buffer queue of the job to allow a next job in the buffer queue to be processed by the information processing system.

13. The method according to claim 12, further comprising:
   providing a length field for inputting a duration of a timeout for the timeout mode; and
   setting a type of time for the duration.

14. The method according to claim 13, wherein the type of time is real-time type.

15. The method according to claim 14, further comprising:
   providing a length field for inputting a duration of a timeout for the timeout mode; and
   setting a type of time for the duration.

* * * * *